PROPORTIONAL REEL SERVO SYSTEM

Filed May 15, 1967 2 Sheets-Sheet 1

INVENTOR
DANIEL M. KLANG

INVENTOR
DANIEL M. KLANG

United States Patent Office 3,488,696

Patented Jan. 6, 1970

3,488,696

PROPORTIONAL REEL SERVO SYSTEM

Daniel M. Kiang, Huntington Station, N.Y., assignor to Potter Instrument Company, Inc., Plainview, N.Y., a corporation of New York Filed May 15, 1967, Ser. No. 645,842

Int. Cl. G11b *15/48*

U.S. Cl. 242—190 5 Claims

ABSTRACT OF THE DISCLOSURE

This is a proportional servo system for controlling the rotation of a tape storage reel in a data processing tape handler, and it includes a differential amplifier whose one input is an error signal which is a function of the tape tension and whose other input is a sawtooth wave form or other suitable repetitive ramp input. The differential amplifier output is a series of pulses the widths of which vary as a function of the tape tension; these pulses drive the servo motor, resulting in its being controlled proportionally to the tension in the tape.

BACKGROUND OF THE INVENTION

The present invention, generally, relates to tape handler apparatus of the type customarily used in data processing and, more particularly, to an improved proportional servo system for efficiently controlling the reel servo drive motors in such apparatus.

In a data processing tape handler apparatus, the reels of tape usually are quite massive, weighing several pounds; yet they must be started and stopped in extremely short periods of time. Obviously, therefore, the response time of any control circuit for such electric motors should be low. Otherwise, excessive tension will develop in the tape, resulting in breakage and the accompanying shut down of the tape handler apparatus. Control circuits have been developed but heretofore they have been complex and inefficient in terms of their power consumption.

Accordingly, it is a principal object of the present invention to provide a new and improved servo control system.

It is also an object of the invention to provide a reel servo system that is simple, yet is reliable and effective.

Another object of the present invention is to provide a new and improved reel servo system with low power requirements, resulting in a decrease in heat to be dissipated and an increase in efficiency.

SUMMARY OF THE INVENTION

Briefly, a reel servo system in accordance with this invention has a differential amplifier whose one input is an error signal and whose other input is a periodically varying signal such as a sawtooth signal. The magnitude of the error signal is a function of the tape tension, which in a tension arm machine, for example, may be conveniently developed by a potentiometer driven by the tension arm. The output of the differential amplifier is a series of pulses whose width is a function of the magnitude of the error signal, and this output is coupled to the reel servo motor to drive it.

Advantageously, the differential amplifier is so biased that its output includes an appreciable dead-band in which small error signals produce no output; a proportional band in which the output increases with an increasing error signal; and a saturated or maximum speed band in which the motor is energized to drive it at maximum speed irrespective of the magnitude of the error signal so long as it exceeds a certain level.

BRIEF DESCRIPTION OF THE DRAWINGS

The above and other objects and advantages of the present invention will become readily apparent to one skilled in the art from the following detailed description of a presently preferred embodiment thereof when read in conjunction with the accompanying drawings, in which.

DESCRIPTION OF THE PREFERRED EMBODIMENTS

Figure 1:
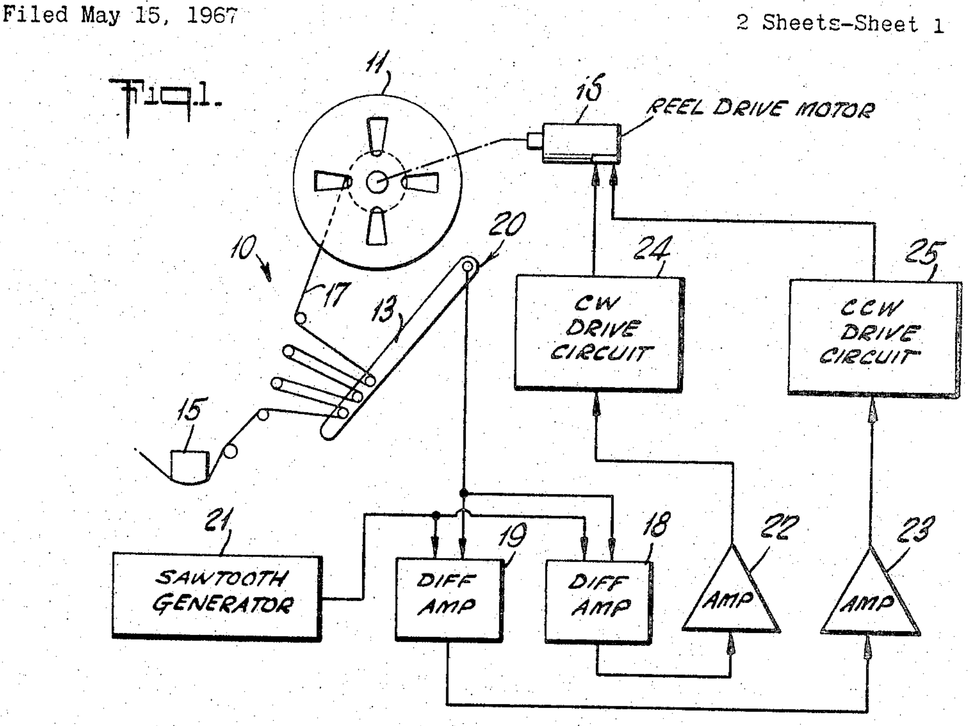
FIGURE 1 is a block diagram illustrating the principles of the present invention.
Figure 2:
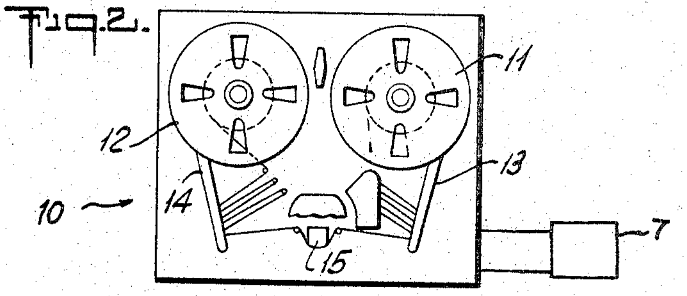
FIGURE 2 is a front view of a data processing tape handler apparatus with which the present invention is adapted for use.

Referring now to FIGURES 1 and 2 of the drawings, the reference numeral 10 identifies a data processing tape handler apparatus, generally, which has a pair of reels 11 and 12, a pair of spring-loaded multiple loop tension arms 13 and 14 and an information processing station 15. Each of the tape storage reels 11 and 12 is driven positively by its own servo drive motor, such as the motor 16 shown in FIGURE 1 driving reel 11.

As the tape 17 advances relatively to the information processing station 15, the tape tension must be maintained relatively constant. To this end the reels 11 and 12 must be started, stopped, speeded up or slowed down within short intervals; during these intervals, slack or excessive tension in the tape 17 is taken up or relieved by movement of the multiple loop tension arms 13 and 14. Advantageously, the tape transport may be powered from a single power supply such as the battery 7.

The reel servo control system of the present invention utilizes differential amplifier circuits 18 and 19 for developing a proportional signal to control the reel servo motors. One voltage input to the differential amplifier circuits 18 and 19 is derived from a potentiometer 20 connected to the shaft of tension arm 13 so that it functions as a tension sensing means for the tape 17 in a manner known to those skilled in the art. The magnitude of the voltage on the wiper arm of the potentiometer 20 is proportional to the angular position of the tension arm 13 and, therefore, to the amount of tension in the tape 17.

The other voltage input to the differential amplifier circuits 18 and 19 preferably is a sawtooth voltage from a generator 21. The sawtooth wave form connected to the circuit 19 is superimposed on a negative D.C. bias so that the sawtooth varies from a negative potential to approximately zero potential. In contrast, the sawtooth wave form connected to the differential amplifier 18 is so biased that it varies from ground potential to a positive value.

Figure 3:
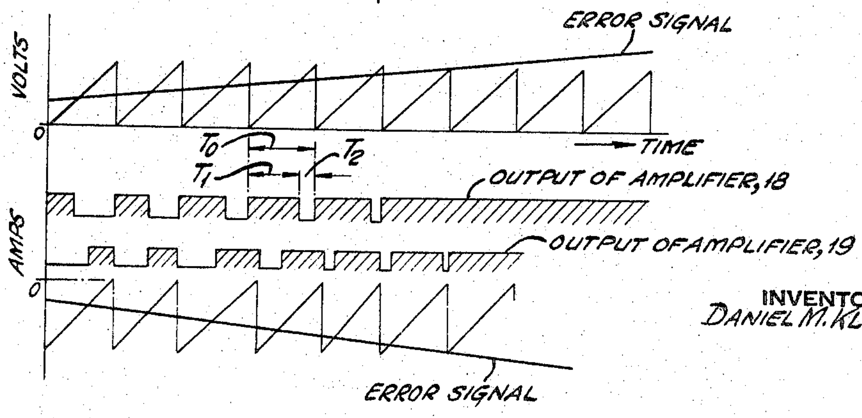
FIGURE 3 is a diagram showing the output of the differential amplifier for an increasing error signal.

Referring now to FIGURE 3, the differential amplifier 18 develops an output signal only when the input to it from potentiometer 20 is more positive than its sawtooth input. Similarly, differential amplifier 19 develops an output signal when the input to it from potentiometer 20 is more negative than the sawtooth input to this amplifier. It can be seen readily that as the error signal increases, the current pulses become greater in width until fiinally the output is constant.

It should be noted that the width of the current pulses increase in time from the "trailing" edge of the voltage sawtooth wave form. This feature permits the two servo motors (those connected with the two reels 11 and 12) to take power from the line at opposite (or complementary) times since, as will be appreciated by those skilled in the art, the tension arms tend to move in opposite directions in normal machine operation. Therefore, the power drive to the servo motors is analogous in its efficiency to a class C amplifier.

Figures 4, 5:
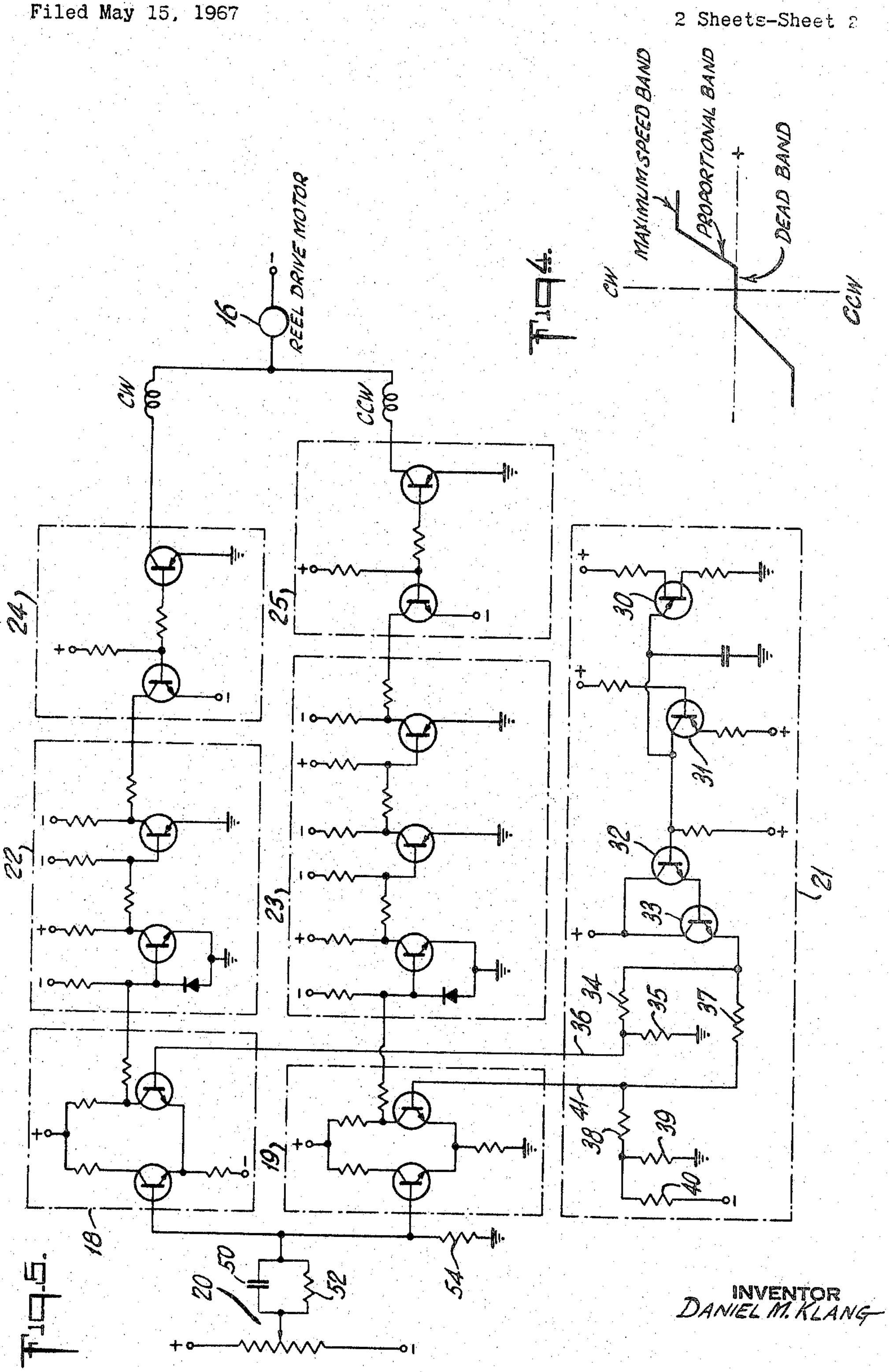
FIGURE 4 shows the response of the servo system of this invention.
FIGURE 5 is a schematic circuit diagram of the servo system of this invention.

The curve shown in FIGURE 4 illustrates the resultant servo motor response. For example, the flat horizontal segment at the upper right indicates the maximum speed band, meaning that interval during which the maximum possible speed is required from the servo motor. The line sloping downwardly to the left indicates a proportional band wherein the speed of the servo motor changes with corresponding changes in the voltage at the sensing device 20. The center part of the curve indicates a deadband wherein there is no rotational output for a voltage change at the sensing device.

Referring now to FIGURE 5 for greater details of a circuit to accomplish the results described hereinbefore, the same reference numerals are used where possible to indicate component parts which have already been identified. For example, the potentiometer 20 is to the left in the figure, and the reel drive servo motor 16 is to the right.

The sawtooth generator 21, basically, is in an oscillator that, by means of transistors 30 and 31, produces a voltage wave form in the general shape of a sawtooth. This wave form is attenuated and level shifted by the transistors 32 and 33, and the network involving the resistors 34 and 35 are effective in providing a D.C. bias for the sawtooth wave form of ground potential so that the wave form rises from ground to a positive value on the line 36.

A four resistor network including resistors 37, 38, 39 and 40 are effective in negatively biasing sawtooth wave form so that it rises from a negative value to ground potential on the line 41. The line 36 provides one of the inputs to the differential amplifier circuit 18, and the line 41 provides one of the inputs to the differential amplifier circuit 19. The other inputs for each of the circuits 18 and 19 comes from the sensing device 20 as previously explained.

By comparing the voltage level of the sensing device 20 with the sawtooth reference voltage, a chain of current pulses is developed, and these are connected to amplifiers 22 and 23 for energizing respective drive circuits 24 and 25. It will be understood that additional transistor stage in the amplifier 23 is for the purpose of inverting the polarity of the current to achieve a proper polarity for energizing the reel drive motor 16 in a counterclockwise direction.

It should be noted that a so-called phase lead network comprising capacitor 50 and a voltage divider network of resistors 52 and 54 are coupled to the wiper arm of potentiometer 20. This phase lead network enhances the system response to rapid changes in the potentiometer output owing to the low impedance path provided for such changes by capacitor 50.

It will be understood that certain features and subcombinations are of utility and may be employed without reference to other features and subcombinations. It is further obvious that various changes may be made in details without departing from the spirit of the invention.

What is claimed is:

1. A magnetic tape transport in which a buffer device on each side of an information processing station forms a tape loop, comprising, in combination:

a first reel motor, a first servo control circuit for said first reel motor comprising;

first means for energizing said motor to rotate in a first direction, second means for energizing said motor to rotate in a second direction opposite to said first, means for generating an error signal that is a function of the size of said loop, said error signal having a first polarity when said loop exceeds a predetermined size and a second opposite polarity when said loop is less than a predetermined size, a first comparator, means for coupling said first comparator to said motor energizing means, a second comparator, means for coupling said second comparator to said second motor energizing means, means for coupling said error signal generating means to said first and said second comparators, means for generating a periodically varying reference signal of said first polarity, means for coupling said reference signal of said first polarity to said first comparator, means for generating a periodically varying reference signal of said second polarity, means for coupling said reference signal of said second polarity to said second comparator, said comparators producing an output signal when the absolute value of said error signal exceeds said reference signal.

2. A magnetic tape transport as in claim 1 wherein said periodically varying reference signal has a sawtooth wave form.

3. A magnetic tape transport as in claim 2 wherein said first and second comparator means include a differential amplifier and means for biasing said amplifier to make said amplifier unresponsive when the absolute value of an error signal is less than a predetermined value.

4. A magnetic tape transport as in claim 1 further including a second reel motor, a second servo control circuit for said second reel motor which is the same as said first reel servo system and a single power supply for operating said first and said second servo control circuits.

5. A magnetic tape transport as in claim 4 wherein said power supply is a battery.

References Cited

UNITED STATES PATENTS

| | | | |
|---|---|---|---|
| 3,105,179 | 9/1963 | Young et al. | 242—75.5 X |
| 3,244,954 | 4/1966 | Branco | 318—7 |
| 3,261,563 | 7/1966 | Aweida et al. | 242—55.12 |

GEORGE F. MAUTZ, Primary Examiner

U.S. Cl. X.R.

242—75.51; 318—6